June 28, 1966 J. W. HARRISON ETAL 3,257,768
CORNER LOCK PACKAGE
Filed April 17, 1962 2 Sheets-Sheet 1

3,257,768
CORNER LOCK PACKAGE
John W. Harrison, Winchester, Mass., and Wylie C. Kirkpatrick, Greenwich, Conn., assignors to W. R. Grace & Co., Cambridge, Mass., a corporation of Connecticut
Filed Apr. 17, 1962, Ser. No. 188,191
2 Claims. (Cl. 53—30)

This invention relates to shrink packaging and more particularly to a novel method of securing a cover of heat-shrinkable, thermoplastic film to a rimless tray or a backing board and to the packages resulting therefrom.

Previously, it has been known to package goods in trays or containers and to completely overwrap the goods within the container with a sheet of film. The film edges are usually folded across the bottom of the container and are secured either by means of tapes or glue or by heat sealing the overwrapped film edges. An economic drawback of this type of packaging is that much more material is required for the cover sheet than is necessary. Furthermore, the folding of the extra sheet material beneath the container is not only time consuming but presents an unattractive package.

It would be desirable, therefore, to use a minimum of film cover material while maintaining a neat and attractive package. This can be accomplished by the use of a heat-shrinkable thermoplastic film material as a cover for a product or products contained in a tray or on a backing board. Such heat-shrinkable film material may be, for example, irradiated, biaxially oriented polyethylene, the preparation of which is disclosed in United States Patent 2,877,500 to Rainer et al. and in United State Patent 3,022,543 to Baird et al. Other film materials include, but are not limited to, biaxially oriented polypropylene, biaxially oriented vinylidene chloride copolymers (Saran), biaxially oriented polyethylene terephthalate, biaxially oriented rubber hydrochloride, and biaxially oriented polystyrene. The cover sheet material which is somewhat larger than the area defined by the side walls of the container is placed over the product contained in a tray or on a backing board and is shrunk tightly against the container sides by any suitable means, such as hot air from a hot air blower with a gas temperature of 300° F. to 750° F. However, a serious problem encountered with shrink cover packaging is the difficulty of retaining the cover sheet snugly over the container as the film material is being shrunk. This is particularly true of straight side wall and/or rimless containers. Even containers with side walls flared outwardly do not hold the cover sheet firmly and neatly, for as the film material is subjected to shrink temperatures, it tends to creep up the side walls and over the edge due to the elasticity and shrinking force of the cover film which cause the sides of the containers to flex or bend inwardly. This results in a poorly covered container which is unable to withstand the handling ordinarily encountered in the packaging industry.

It is, therefore, an object of the present invention to provide a heat-shrinkable film cover for an open-faced container in which the edges of the film cover are tightly locked to the tray or backing board.

Still further objects and the entire scope of applicability of the present invention will become apparent from the following detailed description.

It should be understood that the detailed description and specific examples, while indicating preferred embodiments of the invention, are given by way of illustration only, since various modifications within the scope of the invention will become apparent to those skilled in the art.

Referring to the drawings.

Figure 1:
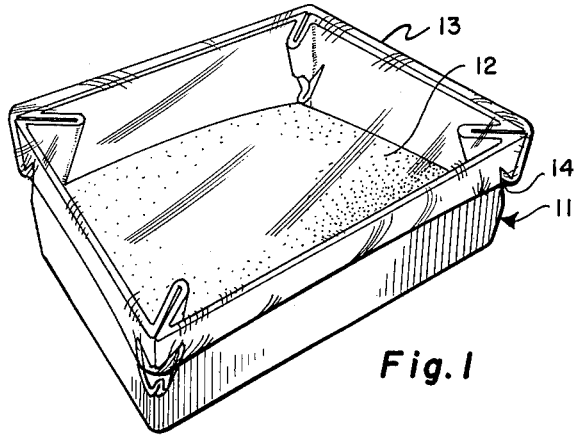
FIGURE 1 is a perspective view of a package covered with a sheet of transparent, heat-shrinkable film in accordance with this invention.

Container 11 shown in FIGURE 1 is a folded cardboard tray on which is mounted a product 12. A cover sheet 13 is draped over the product and side walls of the tray. The film edges which are draped over the four corner notches 14 are shrunk into the notches. The remainder of the film cover sheet is heat shrunk to produce a tight package.

Figure 2:
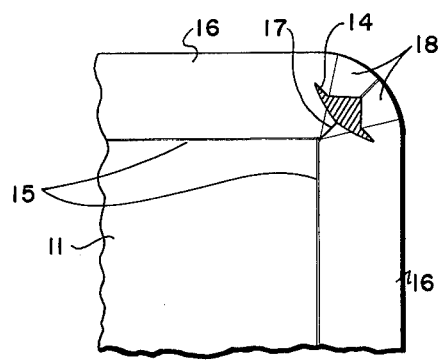
FIGURE 2 is a plan view of the backing board used in FIGURE 1 prior to folding.

In FIGURE 2 the backing board 11 is marked by score lines 15. Sidewall areas 16 are bent upwardly on score lines 15, and score line 17 is bent inwardly toward the center of the container bringing the underside of areas 18 into face-to-face relationship. Shaded area 14 designates the shape of the cut out notch.

Figure 3:
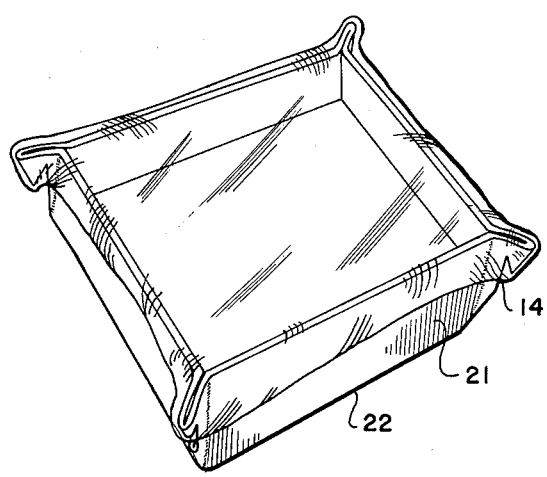
FIGURE 3 is a perspective view of a modified package of the present invention.
Figure 4:
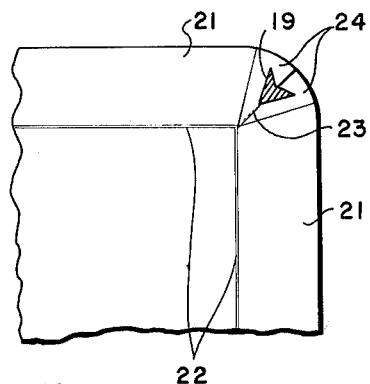
FIGURE 4 is a plan view of the backing board used in FIGURE 3 prior to folding.

In FIGURE 4 the shaded area 19 is a variation of the cut-out notched locking hook seen in FIGURE 2. Side wall areas 21 are bent upwardly on surface score lines 22 and score line 23 is bent outwardly bringing areas 24 into face-to-face relationship. The finished package, a perspective view of which is seen in FIGURE 3, differs from FIGURES 1 and 2 in that the four cornerlocks of the container project outwardly and preferably are glued or stapled before the cover sheet is applied. This would not be necessary in the package of FIGURES 1 and 2, since the film actually locks the folded corners together.

An additional feature of the package of FIGURE 3 lies in the fact that the outward projections hold the film away from the sides at the corners providing increased ventilation if desired, such as when packaging fresh fruits and vegetables.

Figure 5:
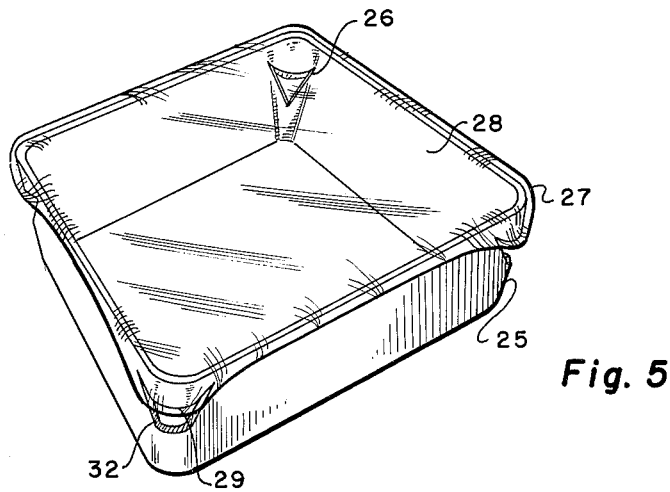
FIGURE 5 is a perspective view of a molded pulp tray covered with a sheet of transparent heat-shrinkable film.

In FIGURE 5 where a rimless molded pulp tray 25 is used as the container, a notch is cut out from each of the four curved, outwardly flared corners 27 of the container in order to hook the film 28 under the upper edge 29 of the notch 26 which is cut in a plane approximately parallel to the plane of the base of the container. The lower edge 32 of the notch 26 is cut at an acute angle of less than 90°, preferably at 45°, with respect to the upper edge 29. The advantage of employing the corner notches of the above three examples is that the backing board or container material is not easily deformed by the strain of the shrinking film cover at these points and, therefore, the container material can be of a somewhat flexible nature.

Figure 6:
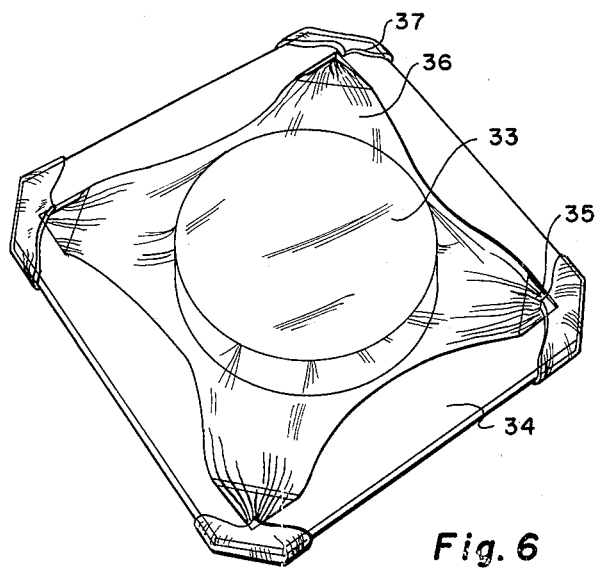
FIGURE 6 is a perspective view of a modified package of the present invention.

A variation of the film-locking tray design is shown in FIGURE 6. In FIGURE 6, the product 33 is mounted on a backing board 34, provided with slots 35 adjacent to each of the four corners. The cover sheet 36 is draped over the product, and the four corner ends 37 of the cover sheet film material are brought through the slots and up over the top edges of the backing board corners. The film edges are then subjected to shrinking which locks the film about the four corners followed by shrinking the rest of the film covering the product which provides a tightly fitting, wrinkle-free package.

The source of heat employed to shrink the film is a hot air blower which has a gas temperature of 300° F. to 750° F. Other temperatures can be employed provided they are high enough to shrink the film. Other heat sources such as heated metal surfaces can be used to shrink the film.

Trays or containers may be made of pressed fiber, compressed pulp, aluminum and plastic materials. The term container as used herein refers to such articles as are known in the art by that name and also specifically includes rigid, flat supporting structures such as backing boards.

The invention described in detail is susceptible to changes and modifications, both as to method and resulting articles, without departing from the principle and spirit thereof.

We claim:

1. Method for securely and firmly packaging product on a rectangular rigid backing board at least slightly larger than the product comprising
   (a) cutting a small opening through the backing board adjacent to but spaced from each of the four corners thereof
   (b) placing product to be packaged on the backing board within the area bounded by the said openings
   (c) placing over the product a rectangular cover sheet of heat shrinkable film material of a size at least slightly larger than the backing board
   (d) drawing a corner of the film sheet through each of the openings and reversely folding each of said corners back over the surface of the backing board upon which the product is resting
   (e) selectively heat shrinking the reversely folded film corners to lock the cover sheet over the product and to the backing board and subsequently
   (f) heat shrinking the remainder of the film material to form a tight, wrinkle-free cover over the top of the product.

2. A package comprising
   (a) a rigid flat generally rectangular backing board having a small opening therethrough adjacent to but spaced from each of its four corners
   (b) product supported on said backing board within the area bounded by said openings, and
   (c) a sheet of heat shrinkable film material, the respective corners of which are each drawn through the openings and reversely folded back over the surface of the backing board upon which the product is supported, each such film corner being heat shrunk to lock the film sheet over the product and to the backing board and the remainder of said film sheet being heat shrunk into a tight, wrinkle-free cover over the top of the product.

References Cited by the Examiner
UNITED STATES PATENTS

| | | | |
|---|---|---|---|
| 2,524,306 | 10/1950 | Buzzerd. | |
| 2,636,460 | 4/1953 | Seiderman. | |
| 2,836,339 | 5/1958 | Pringle | 206—45.33 |
| 2,976,655 | 3/1961 | Dreyfus et al. | 53—30 X |
| 2,992,457 | 7/1961 | Harrison. | |
| 3,034,271 | 5/1962 | Carpenter et al. | 53—184 |

FRANK E. BAILEY, *Primary Examiner.*

ROBERT A. LEIGHEY, *Examiner.*

W. M. COHEN, S. ABEND, *Assistant Examiners.*